(No Model.) 5 Sheets—Sheet 3.
G. B. FREEMAN.
MACHINE FOR MAKING BRIDLE BITS.
No. 512,875. Patented Jan. 16, 1894.
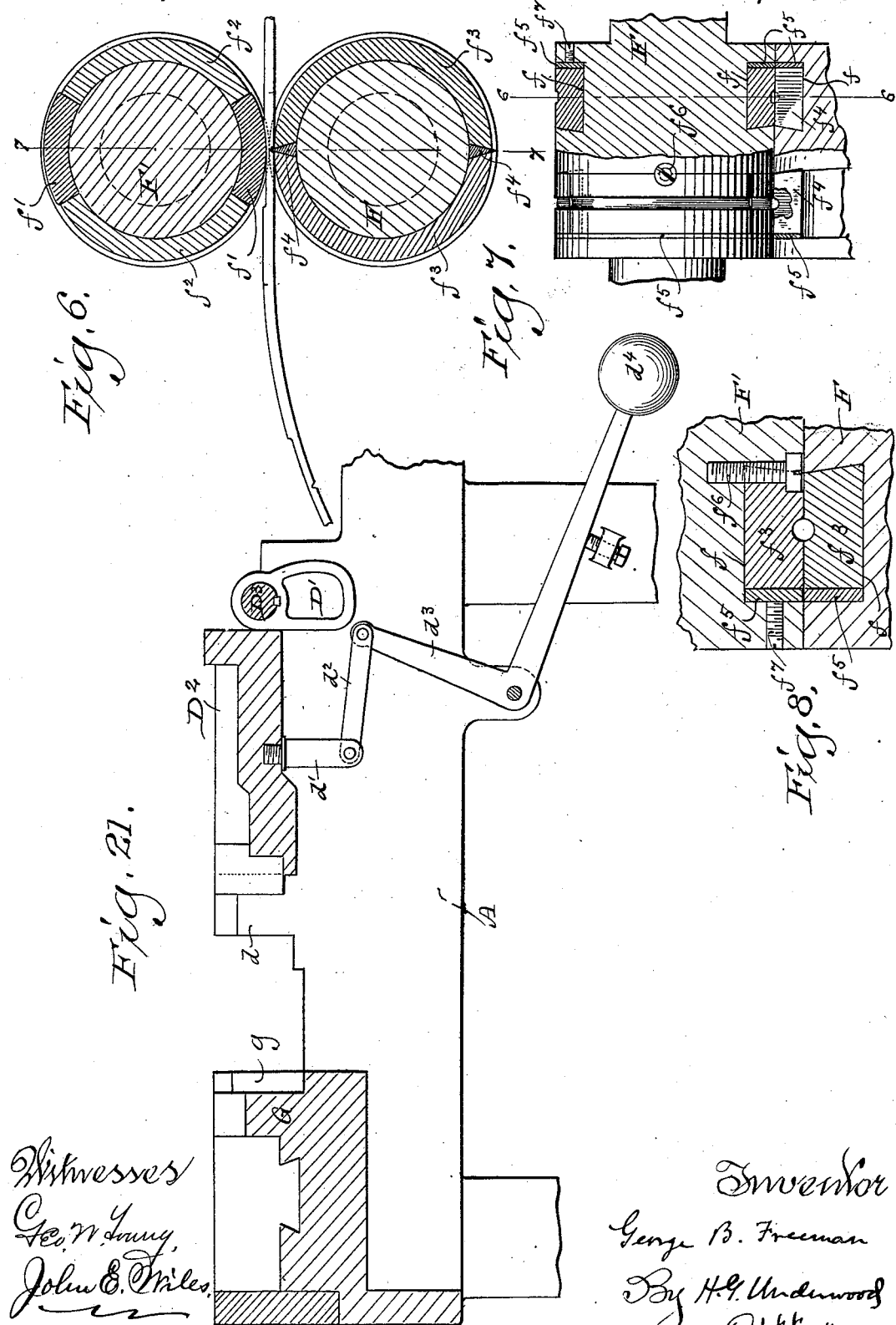
Witnesses
Geo. W. Irving,
John E. Miles.
Inventor
George B. Freeman
By H. G. Underwood
Attorney

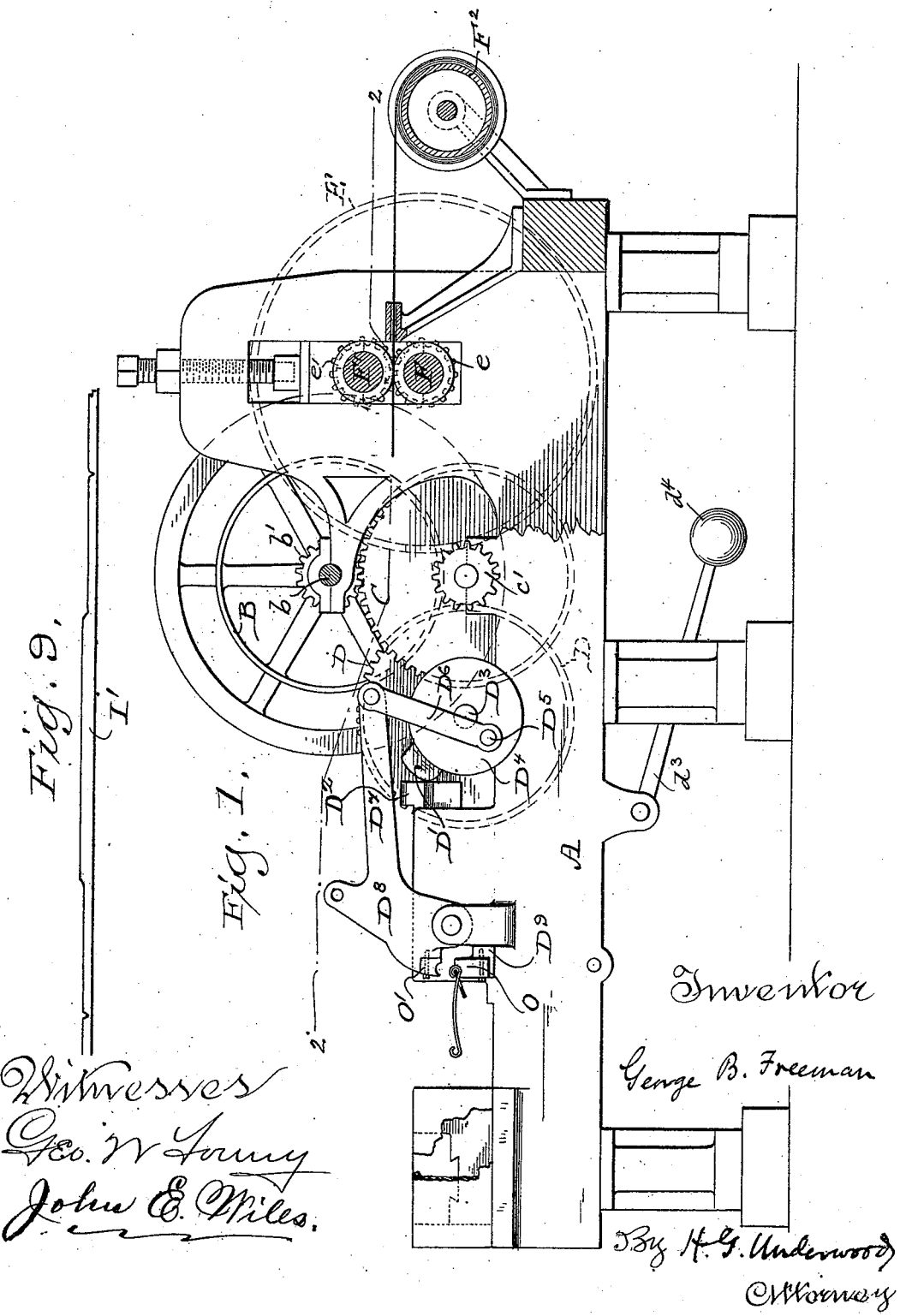

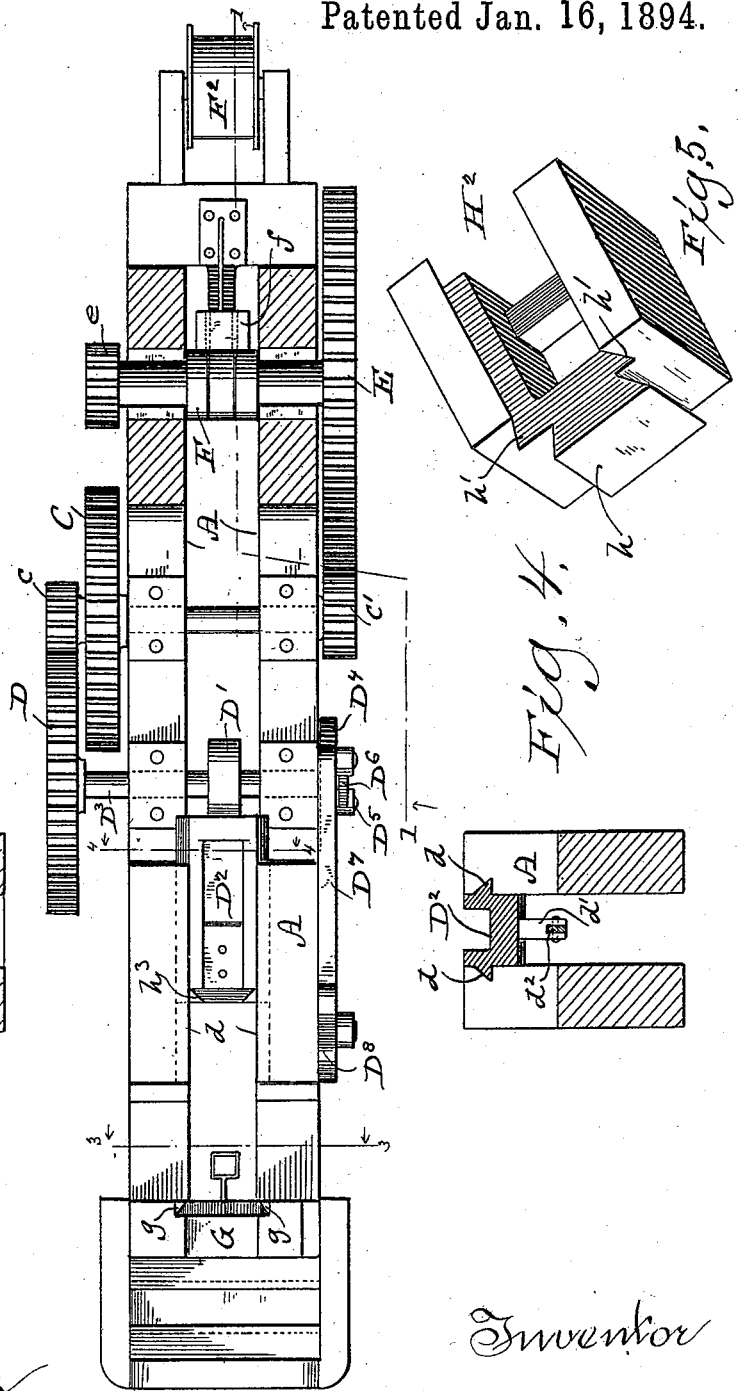

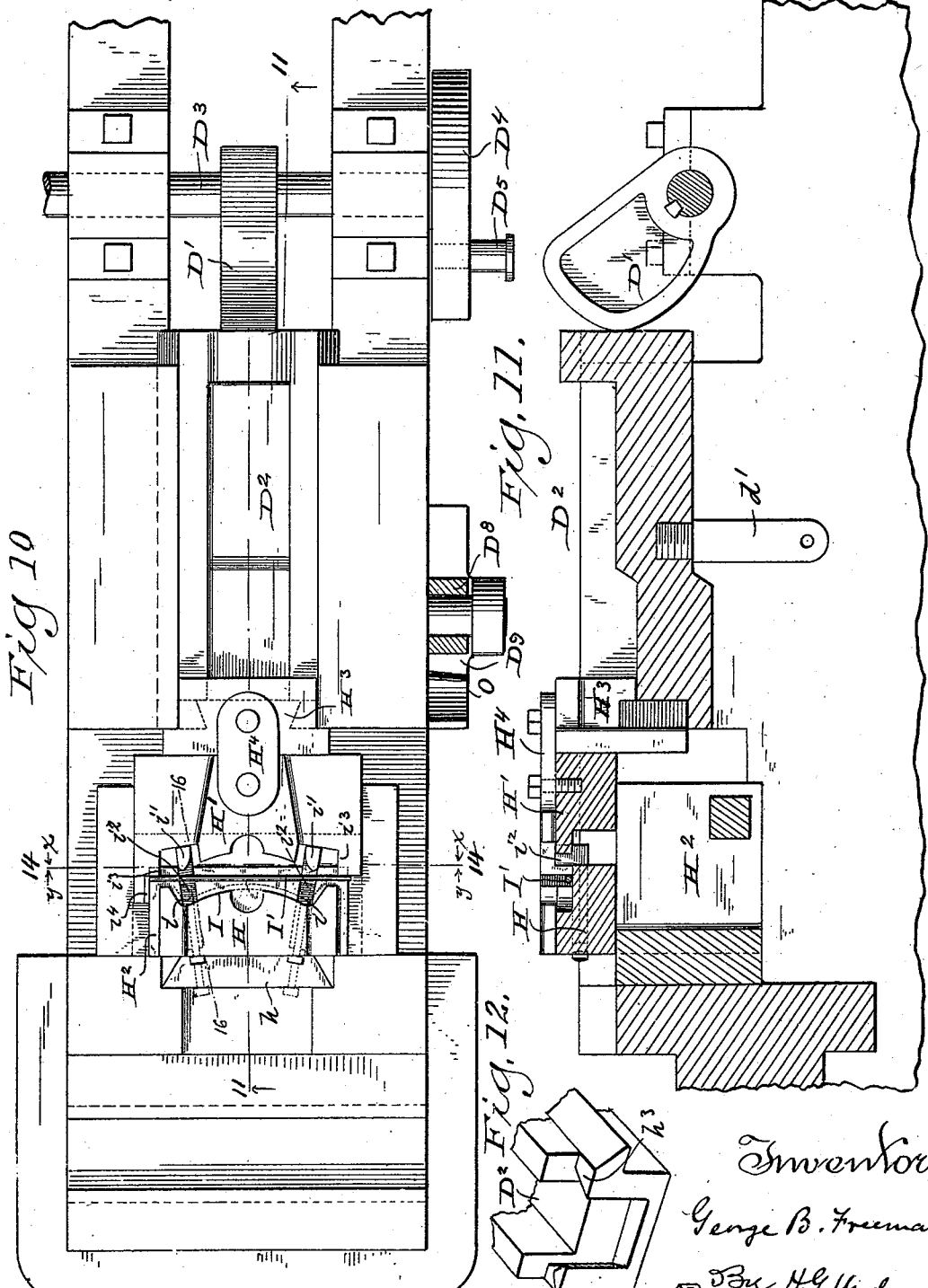

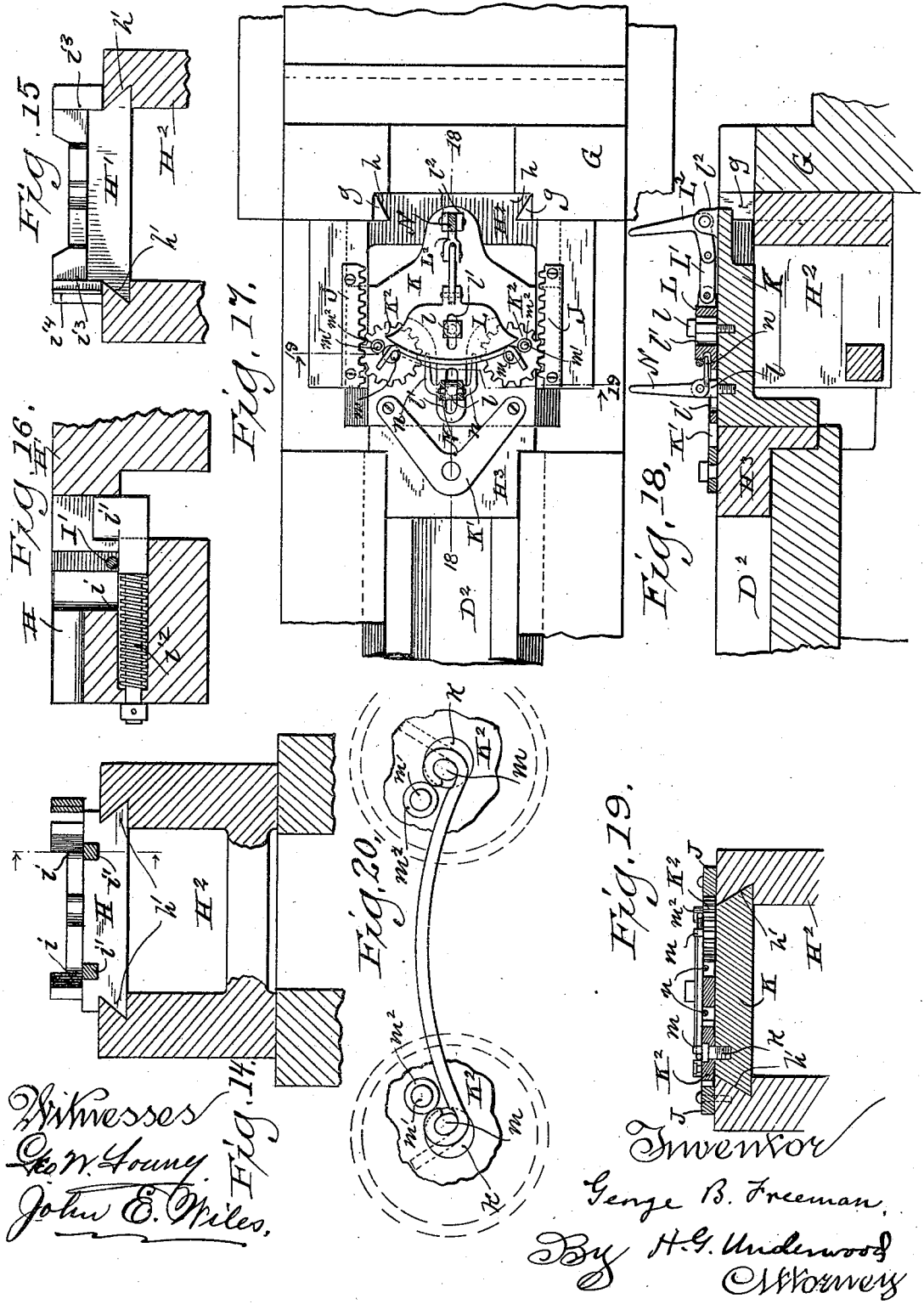

UNITED STATES PATENT OFFICE.

GEORGE B. FREEMAN, OF RACINE, WISCONSIN.

MACHINE FOR MAKING BRIDLE-BITS.

SPECIFICATION forming part of Letters Patent No. 512,875, dated January 16, 1894.

Application filed February 13, 1892. Serial No. 421,390. (No model.)

*To all whom it may concern:*

Be it known that I, GEORGE B. FREEMAN, a citizen of the United States, and a resident of Racine, in the county of Racine, and in the State of Wisconsin, have invented certain new and useful Improvements in Machines for Making Bridle-Bits; and I do hereby declare that the following is a full, clear, and exact description thereof.

My invention relates to combination metal working machines more particularly to a machine for making bit bars, and consists in the matters hereinafter described and pointed out in the appended claims.

The various features of my invention will be hereinafter described with reference to the accompanying drawings in which—

Figure 1 is a side elevation partly in section on line 1—1 of Fig. 2 of a machine constructed in accordance with my invention. Fig. 2 is a plan view of the same partly in section on line 2—2— of Fig. 1. Fig. 3 is a vertical cross section of the same taken on line 3—3 of Fig. 2. Fig. 4 is a similar section on line 4—4 of Fig. 2. Fig. 5 is a detail perspective view of one of the parts. Fig. 6 is a cross sectional view of a pair of forming rolls taken on line 6—6 of Fig. 7. Fig. 7 is a view of the same partly in elevation and partly in section on line 7—7 of Fig. 6. Fig. 8 is an enlarged detail sectional view illustrating the arrangement of the forming dies in said rolls. Fig. 9 is a separate view of a bar of metal which has been passed between the forming rolls illustrated in Figs. 6, 7, and 8. Fig. 10, is an enlarged plan view of one end of the machine, showing the arrangement of dies for bending said bars. Fig. 11, is a vertical sectional view of the same taken on line 11—11 of Fig. 10. Figs. 12 and 13 are detail perspective views of portions of the same. Fig. 14, is a vertical cross sectional view taken on line 14—14 of Fig. 10, and looking in the direction of the arrows $x$—$x$. Fig. 15, is a similar section taken on the same line, but looking in the direction of the arrows $y$—$y$. Fig. 16, is a detail section taken on line 16—16 of Fig. 10. Fig. 17, is a top plan view of a portion of the machine showing other dies for further bending or forming the bit bar. Fig. 18, is a vertical longitudinal section of the same taken on line 18—18 of Fig. 17. Fig. 19, is a vertical cross section of the same taken on line 19—19 of Fig. 17. Fig. 20, is an enlarged detail view showing the bit bar bent into shape for connection to the other parts. Fig. 21, is a longitudinal section of a portion of the machine.

In said drawings: A represents a suitable supporting frame; B a driving pulley mounted upon a transverse shaft $b$ which carries at one end a driving pinion $b'$, meshing with a gear C. On opposite ends of the shaft of said gear C, are secured pinions $c$ and $c'$ respectively engaging with gears D and E. Upon the axis of said gear E is provided a roll F, and a similar roll F' is journaled in the frame A in such a position as to act in opposition to the roll F upon a bar or rod of metal which may be passed between said rolls. Gears $e\,e'$ are provided upon the ends of the axes of the rolls F F' and are arranged to engage with each other so as to transmit motion from one of said rolls to the other.

Upon the axis of the gear D, is secured a cam D' arranged to engage with the end of a reciprocatory carriage D² which is arranged to carry a suitable die. This carriage D² is arranged to slide longitudinally in suitable guides $d\,d$ in the frame A, and a stationary head G is arranged to hold a suitable die in opposition to the die carried by the carriage D², said head being conveniently provided with a dovetail slot or recess $g$ within which a correspondingly shaped portion of the die may be engaged.

Upon the lower side of the carriage D² is conveniently provided a projecting stud $d'$ to which one end of a link $d^2$ is connected, the other end of said link being secured to one arm of a bell-crank lever $d^3$, upon the other arm of which is provided a weight $d^4$, this construction being illustrated more particularly in Fig. 21. By this construction, rotary motion of the cam D' will obviously operate to move the carriage D² in one direction to operate the dies and the weighted bell crank with its connections will serve to retract the carriage after each stroke of the dies.

In the manufacture of bit bars by my improved machine, the wire or rod from which said bars are formed is first passed through the rolls F F' and given the desired shape preparatory to the bending operation; the bar is then placed in the die which is held by the head G, and submitted to pressure between said die and the die carried by the reciprocatory carriage $D^2$, so as to give the proper bend to the central part of the bit bar and to give a lateral bend to each of the ends, preparatory to being formed into eyes to receive the rings by which it is connected to the bridle, and finally said bar is placed in a suitable die and submitted to a further bending operation whereby said ends are bent or curled round suitable mandrels so as to form the aforesaid eyes.

I will now describe in detail the mechanism for accomplishing these several steps in the process of manufacturing bit-bars. The rolls F F' are provided with circumferential grooves $f f$, as illustrated more particularly in Figs. 6, 7 and 8, and within said groove in one of said rolls, are secured suitable segmental dies $f'—f'—$ and intermediate filling segments $f^2 f^2$ for holding said segmental dies in proper position. The said dies are arranged so as to compress the wire as it is passed between the rolls, while the filling segments $f^2 f^2$ are grooved so as simply to guide the wire without exerting any great amount of pressure thereon. In the groove $f$ in the opposing roll, are similarly arranged grooved, segmental filling pieces $f^3 f^3$ and intermediate cutting blades $f^4 f^4$, the arrangement being such that as the two rolls revolve together each of the portions of the wire or rod acted upon by the dies $f' f'$ will be compressed by said dies, and cut midway by one of the cutting blades $f^4$. In this manner the wire or rod will be divided into bars having flattened or compressed ends adapted to be bent to form the eyes for engaging with the rings which connect the bit bar to the bridle.

For different styles or shapes of bit-bars differently shaped dies $f' f'$ may obviously be employed in place of the ones shown.

The dies, filling segments and cutting blades may be held in engagement with the rolls in any suitable or desired manner, as, for instance, the manner illustrated in Figs. 7 and 8 of the drawings, in which one side of each of the grooves $f$ is slightly undercut and the corresponding side of each of said dies, filling segments and blades, is correspodingly beveled so as to afford a dove-tail connection between said parts and the rolls, and a segmental strip $f^5$ is secured between the opposite wall of the groove and said parts, said strips being adapted to be crowded firmly against the same by means of set screw $f^7$. As a further means of securing said parts in position, set-screws $f^6$ may be passed through the beveled edges of the same and the undercut edges of the grooves so as to engage partially with each of said edges, as more particularly shown in Fig. 8. For giving the first bend to the bars, I employ two dies H and H', secured respectively to the stationary head G and the longitudinally movable carriage $D^2$ in any desired manner. In the particular form of construction illustrated in Figs. 10 to 13 inclusive, the die H is held in position by engagement with the block $H^2$ shown separately in Fig. 5, which block is provided with a dove-tail projection $h$ adapted for engagement with the similarly shaped opening $g$ in the head G, and with horizontally arranged dove-tail guides $h' h'$ within which the die H is slipped so as to bear against the forward surface of the head G, and the die H' is secured to a block $H^3$ which is provided with a dove-tail projection $h^2$ adapted for engagement with a correspondingly shaped recess $h^3$ in the end of the carriage $D^2$, the die H' being conveniently secured in said block by means of a plate or strap $H^4$ which is bolted at one end to the top of said block and at the other to the top of the die H'. The sides of said die H' are suitably shaped to enable them to slidingly engage with the longitudinal guides $h' h'$ in the block $H^2$, so that by this means, the two dies being engaged within the same guides $h' h'$ will always register properly when they come together. The die H is provided with a central portion I around which the central part of the bit bar I' is bent as the dies come together, and with recesses $i i$ of angular contour, located at opposite ends of said curved portion, into which recesses the ends of said bar are pressed when the dies come together so as to give the initial bend to said ends preparatory to forming the eyes therein. Movable jaws $i' i'$ are arranged within suitable bearings in the die H, said jaws being arranged to move in convergent lines as the dies come together so as to engage with the ends of the bar and form the initial angular bends therein. As illustrated more particularly in Fig. 10, these jaws are normally pressed outwardly by springs $i^2 i^2$ so as to permit the bar I' to drop into position between the face of the die H and jaws $i' i'$, and the said jaws are thus arranged to engage with the forward face of the die H' as it approaches the die H, so as to crowd said jaws against the bar. By the convergent movement of said jaws, the ends of the bar are bent into the form illustrated in Fig. 10 by the dotted lines, more readily than could be done by a straight pressure. As also illustrated in Fig. 10, the sides $i^3 i^3$ of the die H' are arranged to move past the edges of the die H as the two dies come together so as to act as shears to cut off the surplus length of metal at the ends of the bar, and in order to enable the operator to always insert the bars in proper position between the dies, a gage or stop $i^4$ is provided, against which the end of the bar is placed when it is inserted in position to receive the stroke of the dies. After the operation of these dies upon the bar, said bar is removed and is in condition for the final bending operation by which the eyes or rings are formed in its ends. The mechanism for accomplishing this latter operation, is constructed and arranged as follows:

The block H² is provided upon opposite sides adjacent to the longitudinal guides h' h', with rack bars J J, and a plate K is slidingly engaged with said guides, said plate K being secured to the block H on the reciprocating carriage D² by means of a connecting plate K'. The plate K is provided with upwardly projecting studs k k upon its upper surface upon which are loosely journaled pinions K² K² which mesh with the teeth of the rack bars J J, so that a longitudinal motion of the carriage D² will move the plate K within the guides h' h' in such a manner as to cause the said pinions to be rotated by their engagement with said racks. A jaw L is slidingly engaged with the upper surface of the plate K by means of bolts or studs l l passed through slots l' l' in said jaw and a link L' is engaged at one end with said jaw and at the other end is connected with one arm of a bell-crank lever L² which is pivotally supported upon the top of plate K by means of ears l², l², between which it is secured. The forward face of the jaw L is shaped so as to conform to the curvature of the bit-bar after it leaves the dies which form the initial bend in the same, thereby affording an even and uniform support for the bit bar during the final bending operation.

As shown more particularly in Figs. 17, 19 and 20, pins or studs m m are located upon the upper ends of the axes of the pinions K² K², said pins being of a size and shape to conform to the rings or eyes to be formed in the ends of the bit bars, and suitable studs m' m' provided with rollers m² m² are located upon the upper surfaces of the said pinions, the arrangement being such, that as the carriage D² with block H³ and plate K move longitudinally within the frame, said studs will move in arcs of circles concentric with the axes of said pinions.

The operation of this portion of the apparatus is as follows: A bit bar bent into the form previously described, is placed in the position indicated in Fig. 17, being inserted between the pins or studs m m and the face of the sliding jaw L, when by a movement of the bell-crank lever L², said jaw is moved toward said studs and securely grips said bar between its curved face and said studs. In this position the studs m' m' on the pinions K² K² are in position to engage with the angularly bent ends of the bar as the carriage D² is projected by the action of the cam D'. As the carriage D² is projected by the cam D', these studs on the pinions K² K² are carried around the stationary pins m m in an obvious manner by the rotation of said pinions, thereby bending the ends of the bar around said stationary pins and forming the eyes or rings therein. After this operation, the bar is in the condition shown more particularly in Fig. 20, the eyes or rings in its ends being left slightly open, so as to permit of the insertion of suitable rings by means of which the bar is secured to the bridle, and then each eye of the bar, with its ring in place, is closed between the dies O O' of the lever press attachment, shown in Fig. 1, the lower die O being secured to the stationary lower jaw D⁹ of said press, and the upper die O' to the pivoted jaw D⁸ which has a lever D⁷ pivoted to a link D⁶ cranked to the cam-shaft D³, as by wrist-pin D⁵ and disk D⁴, this method of closure obviating hammer marks incident to the common means of closing said eyes. I also provide upon the forward one of the studs l, a lever N pivoted to said stud and provided with fingers n adapted to lie beneath the bar as said bar is being bent by the before described apparatus, and by means of which said bar may be ejected from the bending mechanism after the said operation is completed.

The dies for forming the first bend in the bars, and the mechanism for effecting the final operation may be arranged so as to be interchangeably mounted in the same supporting blocks and operated by the same driving cam, as is illustrated in the drawings, and by such arrangement of said parts, greater economy of space is effected than when they are separately mounted and operated. I would have it understood however, that I do not desire to limit myself to the exact form of construction and arrangement of parts illustrated in the drawings and herein described, as various modifications may obviously be made in details of construction without in any way affecting the merits of my invention.

One great advantage of my device lies in the fact that by its use I am enabled to bend the wire, and form the bars, with the metal in a cold state.

Having thus described my invention, what I claim as new, and desire to secure by Letters Patent of the United States, is—

1. In a machine for making bit bars, the combination with a reciprocating carriage and an opposing head, of a die removably engaged with said carriage, and a die removably engaged with said head, one of said dies being provided with movable jaws working in depressions in its face, said jaws being arranged so as to engage with the face of the opposing die as the two dies come together, substantially as set forth.

2. In a machine for making bit bars, the combination with a reciprocating carriage and an opposing stationary head, of a die removably engaged with said carriage and a die removably engaged with said head, one of said dies being provided with shearing edges adapted to work past the edges of the other die, and sliding jaws engaged with one of said dies and adapted for engagement with the face of the opposite jaw, substantially as set forth.

3. In a machine for making bit bars, the combination with a reciprocating carriage and an opposing stationary head, of a block removably supported upon said head and provided with rack bars, a plate slidingly engaged with said block and connected with the reciprocating carriage, pins or studs on said plate adapted for engagement with the bars, and pinions journaled upon said plate and carrying studs adapted to also engage with the ends of said bars, said pinions being arranged to mesh with the teeth of said rack bars whereby longitudinal motion of the carriage will cause said pinions to rotate so as to bend the ends of said bars around the studs upon said plate, substantially as set forth.

4. In a machine for making bit bars, the combination with a reciprocating carriage and a stationary head opposed thereto, of a block removably engaged with said head and provided with rack bars, a plate engaged with the carriage and slidingly engaged with said block, a movable jaw on said plate, studs on said plate opposed to said jaw, pinions loosely journaled on said studs, and carrying pins adapted to move in arcs of circles concentric with said studs, said pinions being arranged so as to mesh with the teeth of said rack bars, whereby a longitudinal movement of said carriage will cause said pinions to rotate so as to bend the ends of a bar held between the jaw and studs, around the latter, substantially as set forth.

In testimony that I claim the foregoing I have hereunto set my hand, at Racine, in the county of Racine and State of Wisconsin, in the presence of two witnesses.

GEORGE B. FREEMAN.

Witnesses:
THOMAS NEWLOVE,
ARNOLD STATZ.